(12) United States Patent
Hendrickson et al.

(10) Patent No.: US 7,644,639 B2
(45) Date of Patent: Jan. 12, 2010

(54) MULTI-SPEED TRANSMISSION WITH COUNTERSHAFT GEARING

(75) Inventors: James D. Hendrickson, Belleville, MI (US); John A. Diemer, Farmington Hills, MI (US); Patrick S. Portell, Pinckney, MI (US); Henryk Sowul, Oxford, MI (US); Ted T. Selever, Farmington Hills, MI (US); Tejinder Singh, Canton, MI (US); Craig S. Ross, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 342 days.

(21) Appl. No.: 11/678,178

(22) Filed: Feb. 23, 2007

(65) Prior Publication Data
US 2008/0202267 A1 Aug. 28, 2008

(51) Int. Cl.
*F16H 3/093* (2006.01)
(52) U.S. Cl. .............................. 74/370; 74/331; 74/340
(58) Field of Classification Search .................. 74/325, 74/329, 330, 331, 340
See application file for complete search history.

(56) References Cited

U.S. PATENT DOCUMENTS

| | | | |
|---|---|---|---|
| 6,209,407 B1 | 4/2001 | Heinzel et al. | |
| 6,958,028 B2 | 10/2005 | Janson et al. | |
| 7,021,169 B2 | 4/2006 | Kobayashi | |
| 7,225,696 B2 | 6/2007 | Gitt | |
| 7,240,578 B2 | 7/2007 | Ogami et al. | |
| 7,272,985 B2 | 9/2007 | Gumpoltsberger et al. | |
| 7,340,973 B2 | 3/2008 | Hiraiwa | |
| 7,383,749 B2 | 6/2008 | Schafer et al. | |
| 7,409,886 B2 | 8/2008 | Gitt | |
| 7,437,963 B2 | 10/2008 | Haka et al. | |
| 7,448,290 B2 | 11/2008 | Gitt | |
| 2004/0144190 A1 | 7/2004 | Hall | |
| 2005/0000307 A1 | 1/2005 | Gumpoltsberger | |
| 2005/0103140 A1* | 5/2005 | Gumpoltsberger | 74/329 |
| 2005/0115344 A1 | 6/2005 | Kim et al. | |
| 2005/0115345 A1 | 6/2005 | Gumpoltsberger et al. | |
| 2005/0193848 A1 | 9/2005 | Gitt | |
| 2005/0204840 A1 | 9/2005 | Soeda | |
| 2006/0117882 A1 | 6/2006 | Gitt | |
| 2006/0174722 A1* | 8/2006 | Terai | 74/325 |
| 2006/0219033 A1 | 10/2006 | Gitt | |
| 2006/0266141 A1* | 11/2006 | Ogami | 74/325 |
| 2006/0266144 A1 | 11/2006 | Schafer et al. | |
| 2007/0022835 A1 | 2/2007 | Kilian et al. | |
| 2007/0113696 A1 | 5/2007 | Haka et al. | |
| 2007/0180942 A1 | 8/2007 | Antonov | |
| 2008/0047378 A1 | 2/2008 | Borgerson et al. | |
| 2008/0134820 A1 | 6/2008 | Bjorck et al. | |
| 2008/0141808 A1 | 6/2008 | Gumpoltsberger | |
| 2008/0196526 A1 | 8/2008 | Singh et al. | |

(Continued)

*Primary Examiner*—Sherry L Estremsky
*Assistant Examiner*—Edwin A. Young (57) ABSTRACT

A transmission is provided having a dual clutch, to achieve torque flow through a countershaft gearing arrangement. The countershaft gearing arrangement includes a plurality of co-planar gear sets having gears that are selectively connectable to a plurality of countershafts. At least one transfer gear set transfers torque from the counter shafts to an output shaft. The output shaft is connected to a final drive unit that has a final drive unit output shaft that is transverse to an input member connected at one end to a torque converter and at the other end to the dual clutch.

33 Claims, 8 Drawing Sheets

U.S. PATENT DOCUMENTS

2008/0202265 A1    8/2008   Hendrickson et al.
2008/0202266 A1    8/2008   Hendrickson et al.
2008/0202267 A1    8/2008   Hendrickson et al.
2008/0202268 A1    8/2008   Carey et al.

* cited by examiner

MULTI-SPEED TRANSMISSION WITH COUNTERSHAFT GEARING

TECHNICAL FIELD

The invention relates to a multi-speed transmission having a countershaft gearing arrangement.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

SUMMARY

In an aspect of the present invention a powertrain having a transmission input member, a power source for generating a torque in the input member, a first intermediate shaft, a second intermediate shaft concentric with the first intermediate shaft, a clutch, first and second countershafts, a first and second set of gears, an output shaft and a first transfer gear is provided. The clutch is selectively engagable to couple the transmission input member with one of the first and second intermediate shafts. The first set of gears are connected for common rotation with the first intermediate shaft and intermesh with a first selectable set of gears to form a first plurality of co-planar gear sets, wherein each of the gears of the first selectable set of gears is connectable for common rotation with one of the first and second countershafts for selectively transferring the torque to the countershafts when the clutch is engaged. The second set of gears is connected for common rotation with the second intermediate shaft and intermesh with a second selectable set of gears to form a second plurality of co-planar gear sets, wherein each of the gears of the second selectable set of gears is connectable for common rotation with one of the first and second countershafts for selectively transferring the torque to one of the countershafts when the clutch is engaged. The output shaft is disposed radially outward of the second intermediate shaft. The first transfer gear is coupled to one of the first and second countershafts for transferring torque from the countershaft to the output shaft.

In another aspect of the present invention, the first set of gears further includes two gears.

In another aspect of the present invention, the second set of gears further comprises three gears.

In another aspect of the present invention, the powertrain further includes a first idler gear rotatable about a first idler axis and intermeshing with at least one of the selectable sets of gears of the first set of gears.

In another aspect of the present invention, the powertrain further includes a second idler gear rotatable about the idler axis and intermeshing with at least one of the selectable sets of gears of the first set of gears.

In another aspect of the present invention, the powertrain further includes a second transfer gear connected for common rotation with one of the first and second countershafts and intermeshing with an output gear connected for common rotation with the output shaft for transferring torque from the countershaft to the output shaft.

In another aspect of the present invention, the powertrain further includes a plurality of synchronizers for selectively connecting the first and second set of selectable sets of gears to at least one of the countershafts.

In another aspect of the present invention, the powertrain further includes a final drive unit wherein the final drive unit has an output shaft that is perpendicular to the input member.

In another aspect of the present invention, the clutch is a dual clutch having a first hub connected to the first intermediate shaft and a second hub connected to the second intermediate shaft.

In another aspect of the present invention, the clutch is disposed between the first and second plurality of co-planar gear sets.

In another aspect of the present invention, the powertrain further includes a second clutch for selectively connecting at least one of the first and second selectable set of gears to at least one of the countershafts.

In another aspect of the present invention, the powertrain further includes a third clutch for selectively connecting at least one of the first and second selectable set of gears to at least one of the countershafts.

In another aspect of the present invention, the one of the second plurality of co-planar gear sets that transfers the torque to achieve the first forward gear ratio is disposed adjacent a structural wall of the housing of the powertrain.

In another aspect of the present invention, the one of the second plurality of co-planar gear sets that transfers the torque to achieve the seventh forward gear ratio is disposed adjacent a structural wall of the housing of the powertrain.

The above features and advantages and other features and advantages of the present invention are readily apparent from the following detailed description of the best modes for carrying out the invention when taken in connection with the accompanying drawings.

DESCRIPTION

Figure 1:
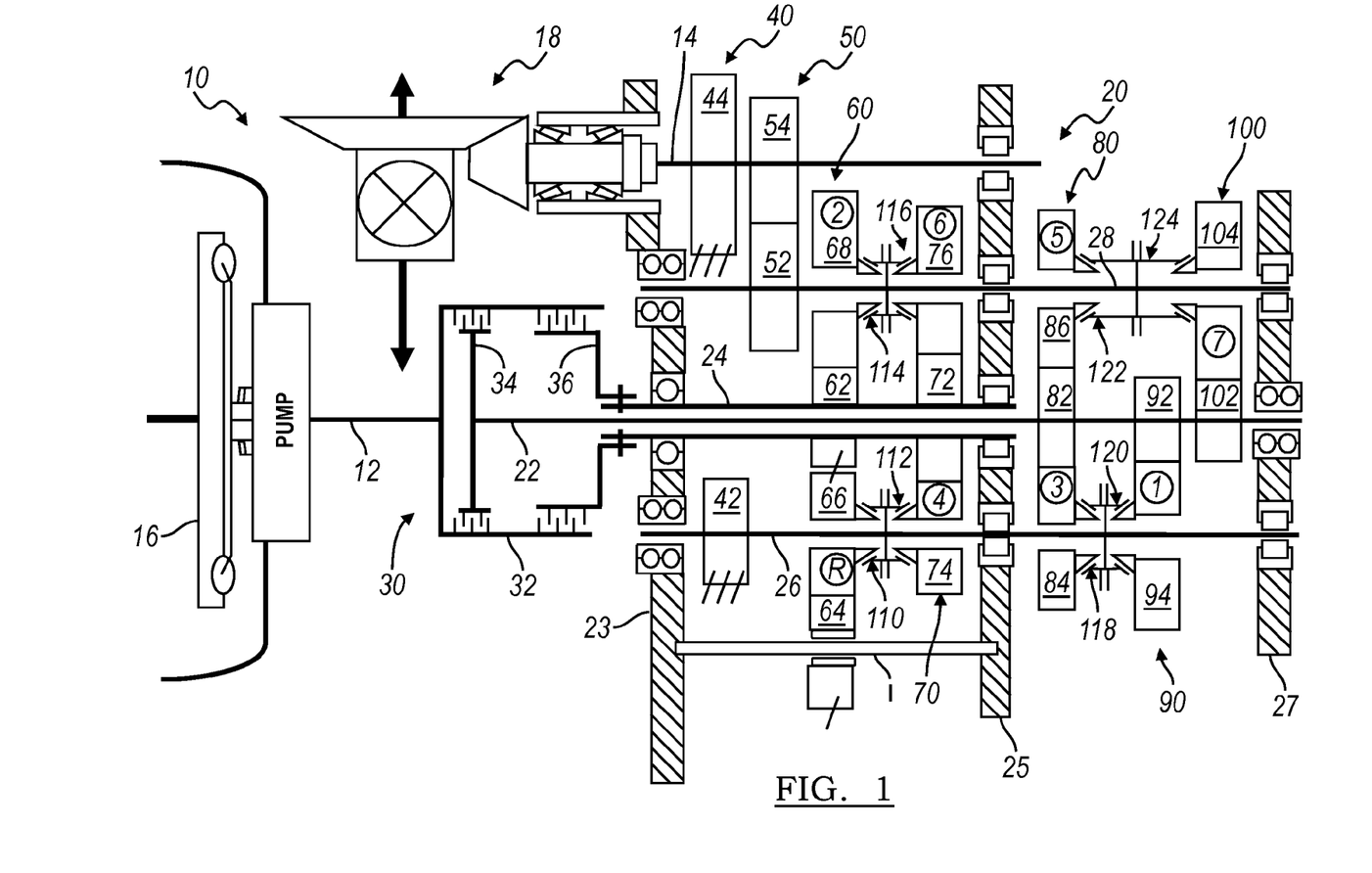
FIG. 1 is a schematic representation of a first embodiment of a transmission in accordance with the invention.

Referring to the drawings, wherein like reference numbers refer to like components, in FIG. 1 a multi-speed transmission 10 is depicted. The transmission 10 includes an input member 12 and output member 14. In the present embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The transmission 10 includes a countershaft gearing arrangement 20 that includes intermediate shafts, countershafts, co-planar intermeshing gear sets and selectively engagable synchronizers as will be described herein. For instance, the countershaft gearing arrangement 20 includes a first intermediate shaft 22 and a second intermediate shaft 24, which is a sleeve shaft concentric with the first intermediate shaft 22. The countershaft gearing arrangement 20 further includes a first countershaft 26 and a second countershaft 28. The countershafts 26, 28 are both spaced from and parallel with the input shaft 12, the output shaft 14 and the intermediate shafts 22, 24.

The first and second intermediate shafts 22, 24, first and second countershafts 26, 28 and output shaft 14 are supported by a first, second and third support structure or wall 23, 25, 27 formed in the housing of transmission 10. As conventionally known, the walls 23, 25, 27 are fitted with bearings 29 for rotatably supporting the first and second intermediate shafts 22, 24, first and second countershafts 26, 28 and output shaft 14. Wall 23 is disposed closest to the torque converter 16 and the final drive unit 18. Wall 25 is disposed adjacent wall 23 and wall 27 is disposed adjacent wall 25.

A dual clutch 30 is connected between input shaft 12 and first and second intermediate shafts 22, 24. The dual clutch 30 includes a clutch housing 32 connected for common rotation with input shaft 12. Further, clutch 30 has a first and a second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates mounted thereon that interact to form a friction clutch. Further, clutch element 34 is connected for common rotation with first intermediate shaft 22 and clutch element 36 is connected for common rotation with second intermediate shaft 24. Thus, selective engagement of clutch element 34 with clutch housing 32, connects the input shaft 12 for common rotation with first intermediate shaft 22 and selective engagement of clutch element 36 with clutch housing 32, connects the input shaft 12 for common rotation with second intermediate shaft 24.

The countershaft gearing arrangement 20 also includes co-planar, intermeshing gear sets 40, 50, 60, 70, 80, 90 and 100. Gear set 40 is a transfer gear set that includes gears 42 and 44. Gear 42 is connected for common rotation with the countershaft 26 and intermeshes with gear 44. Gear 44 is connected for common rotation with output shaft 14. As shown in FIG. 1, gear set 40 is disposed adjacent wall 23 and transfers torque from first countershaft 26 to output shaft 14.

Co-planar gear set 50 is a transfer gear set that includes gear 52 and gear 54. Gear 52 is connected for common rotation with counter shaft 28 and intermeshes with gear 54. Gear 54 is connected for common rotation with output shaft 14. As shown in FIG. 1, gear set 50 is disposed adjacent gear set 40 and transfers torque from second countershaft 28 to output shaft 14.

Gear set 60 includes co-planar intermeshing gears 62, 64, 66 and 68. Gear 62 is connected for common rotation with second intermediate shaft 24 and intermeshes with idler gear 64 and gear 68. Idler gear 64 is rotatable about idler axis I. Gear 64 also intermeshes with gear 66. Gear 66 is selectively connectable with first countershaft 26. Gear 68 is selectively connectable with second countershaft 28. As shown in FIG. 1, gear set 60 is disposed adjacent gear set 50 and provides second and reverse gear ratios.

Gear set 70 includes co-planar, intermeshing gears 72, 74 and 76. Gear 72 is connected for common rotation with second intermediate shaft 24. Gear 72 intermeshes with gear 74, which is selectively connectable for common rotation with countershaft 26. Gear 72 also intermeshes with gear 76, which is selectively connectable for common rotation with countershaft 28. As shown in FIG. 1, gear set 70 is disposed adjacent gear set 60 and wall 25 and provides fourth and sixth gear ratios.

Gear set 80 includes co-planar, intermeshing gears 82, 84 and 86. Gear 82 is connected for common rotation with first intermediate shaft 22. Gear 82 intermeshes with both gear 84 and gear 86. Gear 84 is selectively connectable for common rotation with the countershaft 26. Gear 86 is selectively connectable for common rotation with the countershaft 28. As shown in FIG. 1, gear set 80 is disposed adjacent wall 25 and provides fifth and third gear ratios.

Gear set 90 includes co-planar, intermeshing gears 92 and 94. Gear 92 is connected for common rotation with first intermediate shaft 22. Gear 92 intermeshes with gear 94. Gear 94 is selectively connectable for common rotation with countershaft 26. As shown in FIG. 1, gear set 90 is disposed adjacent gear set 80 and provides a first gear ratio.

Gear set 100 includes co-planar, intermeshing gears 102 and 104. Gear 102 is connected for common rotation with first intermediate shaft 22. Gear 102 intermeshes with gear 104. Gear 104 is selectively connectable for common rotation with the countershaft 28. As shown in FIG. 1, gear set 100 is disposed adjacent gear set 90 and wall 27 and provides a seventh gear ratio.

The transmission 10 further includes a plurality of selectively engagable synchronizers 110, 112, 114, 116, 118, 120, 122 and 124. Synchronizers 110/112, 114/116, 118/120 and 122/124 are a left and right side of synchronizer assemblies, sharing a common synchronizer hub and sleeve. Synchronizer 110 is selectively engagable to connect gear 66 with countershaft 26 for common rotation therewith. Synchronizer 112 is selectively engagable to connect gear 74 with countershaft 26 for common rotation therewith. Synchronizer 114 is selectively engagable to connect gear 68 with countershaft 28 for common rotation therewith. Synchronizer 116 is selectively engagable to connect gear 76 with countershaft 28 for common rotation therewith. Synchronizer 118 is selectively engagable to connect gear 84 with countershaft 26 for common rotation therewith. Synchronizer 120 is selectively engagable to connect gear 94 with countershaft 26 for common rotation therewith. Synchronizer 122 is selectively engagable to connect gear 86 with countershaft 28 for common rotation therewith. Synchronizer 124 is selectively engagable to connect gear 104 with countershaft 28 for common rotation therewith.

The transmission 10 is capable of transmitting torque from the input shaft 12 to the output shaft 14 in at least seven forward torque ratios and one reverse torque ratio. Each of the forward torque ratios and the reverse torque ratio is attained by engagement of dual clutch 30 and one of the clutch elements 34, 36 and one or more of the synchronizers 110, 112, 114, 116, 118, 120, 122 and 124. Those skilled in the art will readily understand that a different speed ratio is associated with each torque ratio.

To establish the reverse torque ratio clutch element 36 of the dual clutch 30 and synchronizer 110 are engaged. By the engagement of clutch element 36 of the dual clutch 30, torque is transferred from the input shaft 12 through clutch housing 32 to the second intermediate shaft 24. Further, torque is transferred from the second intermediate shaft 24 through gear 62 to idler gear 64. Idler gear 64 transfers the torque to gear 66. Upon engagement of synchronizer 110, gear 66 transfers torque to countershaft 26. Countershaft 26 transfers the torque to gear 42. Gear 42 transfers torque to gear 44, which in turn transfers the torque to output shaft 14. Output shaft 14 transfers the torque to the final drive unit 18.

A first forward torque ratio (1$^{st}$ gear) is achieved by engaging clutch element 34 of the dual clutch 30 and synchronizer 120. By the engagement of clutch element 34 of the dual clutch 30, torque is transferred from input shaft 12 through clutch housing 32 to the first intermediate shaft 22. Further, torque is transferred from the first intermediate shaft 22 to gear 92. Gear 92 transfers the torque to gear 94. Upon engagement of synchronizer 120, gear 94 transfers torque to counter shaft 26. Counter shaft 26 transfers the torque to gear 42. Gear 42 transfers torque to gear 44, which in turn transfers the torque to output shaft 14. Output shaft 14 transfers the torque to the final drive unit 18.

A subsequent forward torque ratio (2$^{nd}$ gear) is established by engagement of clutch element 36 of the dual clutch 30 and synchronizer 114. By the engagement of clutch element 36 of the dual clutch 30, torque is transferred from input shaft 12 through clutch housing 32 to the second intermediate shaft 24. Further, torque is transferred from the second intermediate shaft 24 to gear 62. Gear 62 transfers the torque to gear 68. Upon engagement of synchronizer 114, gear 68 transfers torque to countershaft 28. Countershaft 28 transfers the torque to gear 52. Gear 52 transfers torque to gear 54, which in turn transfers the torque to output shaft 14. Output shaft 14 transfers the torque to the final drive unit 18.

The subsequent torque ratio (3$^{rd}$ gear) is established by engagement of clutch element 34 of the dual clutch 30 and synchronizer 118. By the engagement of clutch element 34 of the dual clutch 30, torque is transferred from input shaft 12 through clutch housing 32 to the first intermediate shaft 22. Further, torque is transferred from the first intermediate shaft 22 to gear 82. Gear 82 transfers the torque to gear 84. Upon engagement of synchronizer 118, gear 84 transfers torque to countershaft 26. Countershaft 26 transfers the torque to gear 42. Gear 42 transfers torque to gear 44, which in turn transfers the torque to output shaft 14. Output shaft 14 transfers the torque to the final drive unit 18.

The next subsequent forward torque ratio (4$^{th}$ gear) is established by engagement of clutch element 36 of the dual clutch 30 and synchronizer 112. By the engagement of clutch element 36 of the dual clutch 30, torque is transferred from input shaft 12 through clutch housing 32 to the second intermediate shaft 24. Further, torque is transferred from the second intermediate shaft 24 to gear 72. Gear 72 transfers the torque to gear 74. Upon engagement of synchronizer 112, gear 74 transfers torque to countershaft 26. Countershaft 26 transfers the torque to gear 42. Gear 42 transfers torque to gear 44, which in turn transfers the torque to output shaft 14. Output shaft 14 transfers the torque to the final drive unit 18.

The subsequent torque ratio (5$^{th}$ gear) is established by engagement of clutch element 34 of the dual clutch 30 and synchronizer 122. By the engagement of clutch element 34 of the dual clutch 30, torque is transferred from input shaft 12 through clutch housing 32 to the first intermediate shaft 22. Further, torque is transferred from the first intermediate shaft 22 to gear 82. Gear 82 transfers the torque to gear 86. Upon engagement of synchronizer 122, gear 86 transfers torque to countershaft 28. Countershaft 28 transfers the torque to gear 52. Gear 52 transfers torque to gear 54, which in turn transfers the torque to output shaft 14. Output shaft 14 transfers the torque to the final drive unit 18.

A subsequent forward torque ratio (6$^{th}$ gear) is established by engagement of clutch element 36 of the dual clutch 30 and synchronizer 116. By the engagement of clutch element 36 of the dual clutch 30, torque is transferred from input shaft 12 through clutch housing 32 to the second intermediate shaft 24. Further, torque is transferred from the second intermediate shaft 24 to gear 72. Gear 72 transfers the torque to gear 76. Upon engagement of synchronizer 116, gear 76 transfers torque to countershaft 28. Countershaft 28 transfers the torque to gear 52. Gear 52 transfers torque to gear 54, which in turn transfers the torque to output shaft 14. Output shaft 14 transfers the torque to the final drive unit 18.

The subsequent torque ratio (7$^{th}$ gear) is established by engagement of clutch element 34 of the dual clutch 30 and synchronizer 124. By the engagement of clutch element 34 of the dual clutch 30, torque is transferred from input shaft 12 through clutch housing 32 to the first intermediate shaft 22. Further, torque is transferred from the first intermediate shaft 22 to gear 102. Gear 102 transfers the torque to gear 104. Upon engagement of synchronizer 124, gear 104 transfers torque to countershaft 28. Countershaft 28 transfers the torque to gear 52. Gear 52 transfers torque to gear 54, which in turn transfers the torque to output shaft 14. Output shaft 14 transfers the torque to the final drive unit 18.

The present invention contemplates that a variety of torque ratios (i.e., the ratio of torque of the output member 14 to the input member 12) are achievable through the selection of tooth counts of the gears of the transmission 10. Moreover, the present invention advantageously provides the transfer gears 42, 44 in one plane and transfer gears 52, 54 in another plane. This arrangement provides the opportunity to achieve the desired gear ratios. Further, flexibility is provided in the selection of gear ratios with respect to 1$^{st}$ gear and 7$^{th}$ gear, as the gears (92, 94, 102 and 104) that provide these ratios are disposed in two separate planes. Moreover, a single pinion gear 92 is used to provide the 1$^{st}$ gear and a separate single pinion gear 102 is used to provide the 7$^{th}$ gear. An overall transmission length reduction is achieved using the single plane idler gear 64, which establishes a reverse gear ratio.

Second Embodiment

Figure 2:
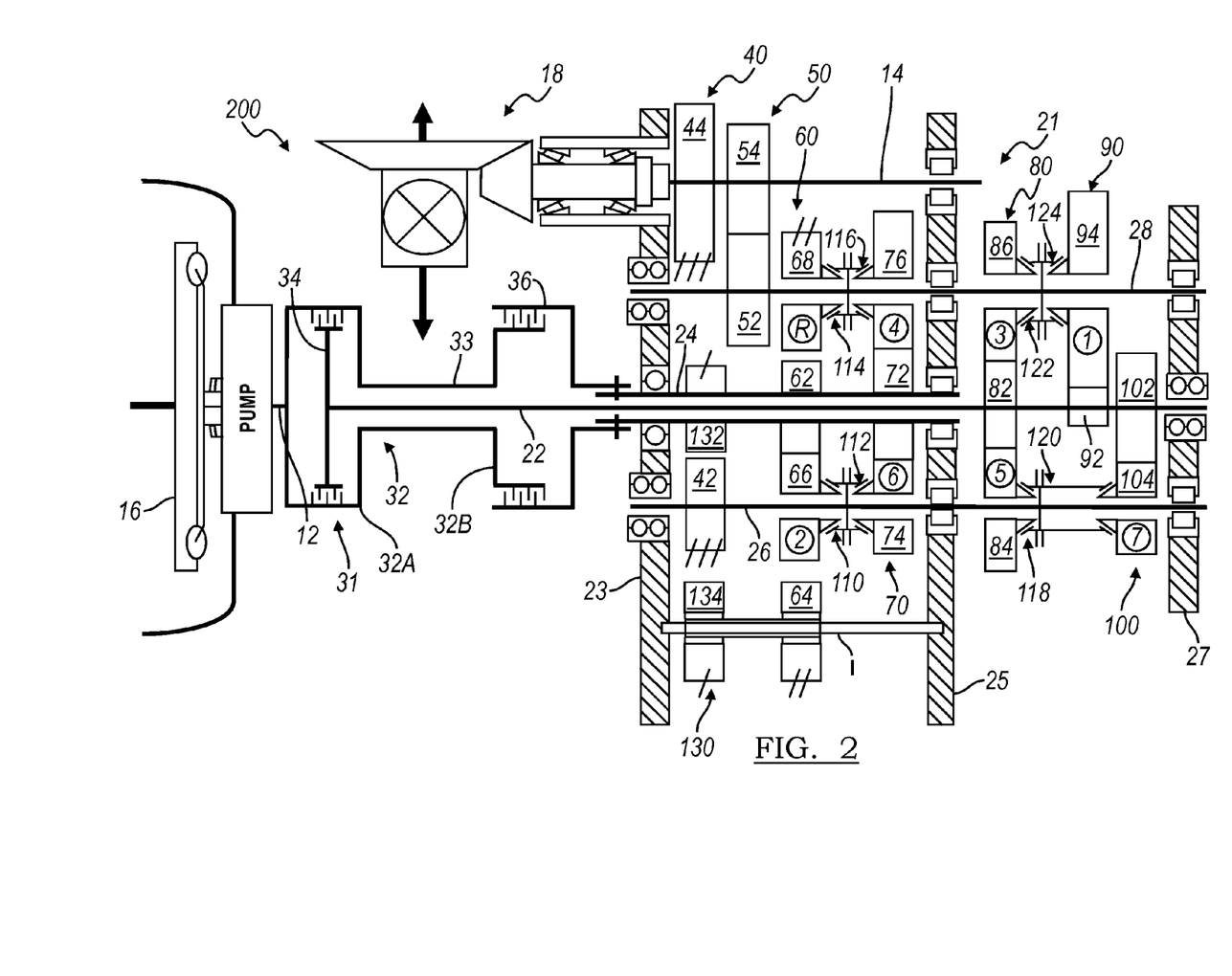
FIG. 2 is a schematic representation of a second embodiment of a transmission in accordance with the invention.

Referring to FIG. 2 a multi-speed transmission 200 is depicted. The transmission 200 includes an input member 12 and an output member 14. In this embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The transmission 200 includes a countershaft gearing arrangement 21 that includes intermediate shafts, countershafts, co-planar intermeshing gear sets and selectively engagable synchronizers as will be described herein. For instance, the countershaft gearing arrangement 21 includes a first intermediate shaft 22 and a second intermediate shaft 24, which is a sleeve shaft concentric with the first intermediate shaft 22. The countershaft gearing arrangement 21 further includes a first countershaft 26 and a second countershaft 28. The countershafts 26, 28 are both spaced from and parallel with the input shaft 12, the output shaft 14 and the intermediate shafts 22, 24.

The first and second intermediate shafts 22, 24, first and second countershafts 26, 28 and output shaft 14 are supported by a first, second and third support structure or wall 23, 25, 27 formed in the housing of transmission 10. As conventionally known, the walls 23, 25, 27 are fitted with bearings 29 for rotatably supporting the first and second intermediate shafts 22, 24, first and second countershafts 26, 28 and output shaft 14. Wall 23 is disposed closest to the torque converter 16 and the final drive unit 18. Wall 25 is disposed adjacent wall 23 and wall 27 is disposed adjacent wall 25.

A dual clutch 31 is connected between input shaft 12 and first and second intermediate shafts 22, 24. The dual clutch 31 includes a clutch housing 32 connected for common rotation with input shaft 12. Clutch housing 32 has a first clutch portion 32a and a second clutch portion 32b connected by a housing shaft 33. Housing shaft 33, for example, is a sleeve shaft that is concentric with first intermediate shaft 22 and may be welded or otherwise connected to first and second clutch portions 32a, 32b or integrally formed therewith. Housing shaft 33 allows first and second clutch portions 32a, 32b to be positioned remote from each other to provide packaging clearance for transverse extending shafts, drivelines and like elements coupled to final drive unit 18. Further, clutch 31 has a first and a second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates mounted thereon that interact to form a friction clutch. Further, clutch element 34 is connected for common rotation with first intermediate shaft 22 and clutch element 36 is connected for common rotation with second intermediate shaft 24. Thus, selective engagement of clutch element 34 with clutch housing 32, connects the input shaft 12 for common rotation with first intermediate shaft 22 and selective engagement of clutch element 36 with clutch housing 32, connects the input shaft 12 for common rotation with second intermediate shaft 24.

The countershaft gearing arrangement 21 also includes co-planar, intermeshing gear sets 40, 50, 60, 70, 80, 90 and 100 and a co-planar idler gear set 130. Gear set 40 is a transfer gear set that includes transfer gears 42 and 44. Transfer gear 42 is connected for common rotation with the countershaft 26 and intermeshes with gear 44. Transfer gear 44 is connected for common rotation with output shaft 14. As shown in FIG. 2, gear set 40 is disposed adjacent wall 23 and transfers torque from first countershaft 26 to output shaft 14.

Co-planar gear set 50 includes transfer gears 52 and 54. Transfer gear 52 is connected for common rotation with counter shaft 28 and intermeshes with gear 54. Transfer gear 54 is connected for common rotation with output shaft 14. As shown in FIG. 2, gear set 50 is disposed adjacent gear set 40 and transfers torque from second countershaft 28 to output shaft 14.

Gear set 60 includes co-planar intermeshing gears 62, 64, 66 and 68. Gear 62 is connected for common rotation with second intermediate shaft 24 and intermeshes with gear 66. Idler gear 64 is rotatable about idler axis I. Gear 64 also intermeshes with gear 68. Gear 66 is selectively connectable with first countershaft 26. Gear 68 is selectively connectable with second countershaft 28. As shown in FIG. 2, gear set 60 is disposed adjacent gear set 50 and provides second and reverse gear ratios.

Gear set 70 includes co-planar, intermeshing gears 72, 74 and 76. Gear 72 is connected for common rotation with second intermediate shaft 24. Gear 72 intermeshes with gear 74, which is selectively connectable for common rotation with countershaft 26. Gear 72 also intermeshes with gear 76, which is selectively connectable for common rotation with countershaft 28. As shown in FIG. 2, gear set 70 is disposed adjacent gear set 60 and wall 25 and provides fourth and sixth gear ratios.

Gear set 80 includes co-planar, intermeshing gears 82, 84 and 86. Gear 82 is connected for common rotation with first intermediate shaft 22. Gear 82 intermeshes with both gear 84 and gear 86. Gear 84 is selectively connectable for common rotation with the countershaft 26. Gear 86 is selectively connectable for common rotation with the countershaft 28. As shown in FIG. 2, gear set 80 is disposed adjacent wall 25 and provides fifth and third gear ratios.

Gear set 90 includes co-planar, intermeshing gears 92 and 94. Gear 92 is connected for common rotation with first intermediate shaft 22. Gear 92 intermeshes with gear 94. Gear 94 is selectively connectable for common rotation with countershaft 28. As shown in FIG. 2, gear set 90 is disposed between gear sets 80 and 100 and provides a first gear ratio.

Gear set 100 includes co-planar, intermeshing gears 102 and 104. Gear 102 is connected for common rotation with first intermediate shaft 22. Gear 102 intermeshes with gear 104. Gear 104 is selectively connectable for common rotation with the countershaft 28. As shown in FIG. 2, gear set 100 is disposed adjacent wall 27 and provides a seventh gear ratio.

Gear set 130 includes co-planar intermeshing gears 132 and 134. Gear 132 is connected for common rotation with second intermediate shaft 24 and intermeshes with idler gear 134. Idler gear 134 is rotatable about idler axis I and is rotationally fixed for common rotation with gear 64 to form a dual plane reverse idler gear. As shown in FIG. 2, gear set 130 is disposed adjacent wall 23 and provides a reverse gear ratio.

The transmission 200 further includes a plurality of selectively engagable synchronizers 110, 112, 114, 116, 118, 120, 122 and 124. Synchronizers 110/112, 114/116, 118/120 and 122/124 are a left and right side of synchronizer assemblies, sharing a common synchronizer hub and sleeve. Synchronizer 110 is selectively engagable to connect gear 66 with countershaft 26 for common rotation therewith. Synchronizer 112 is selectively engagable to connect gear 74 with countershaft 26 for common rotation therewith. Synchronizer 114 is selectively engagable to connect gear 68 with countershaft 28 for common rotation therewith. Synchronizer 116 is selectively engagable to connect gear 76 with countershaft 28 for common rotation therewith. Synchronizer 118 is selectively engagable to connect gear 84 with countershaft 26 for common rotation therewith. Synchronizer 124 is selectively engagable to connect gear 94 with countershaft 28 for common rotation therewith. Synchronizer 122 is selectively engagable to connect gear 86 with countershaft 28 for common rotation therewith. Synchronizer 120 is selectively engagable to connect gear 104 with countershaft 26 for common rotation therewith.

The transmission 200 is capable of transmitting torque from the input shaft 12 to the output shaft 14 in at least seven forward torque ratios and one reverse torque ratio, as indicated in FIG. 2. Each of the forward torque ratios and the reverse torque ratio is attained by engagement of dual clutch 31 and one of the clutch elements 34, 36 and one or more of the synchronizers 110, 112, 114, 116, 118, 120, 122 and 124. Those skilled in the art will readily understand that a different speed ratio is associated with each torque ratio and how these torque ratios are achieved, based on the description of transmission 10.

Third Embodiment

Figure 3:
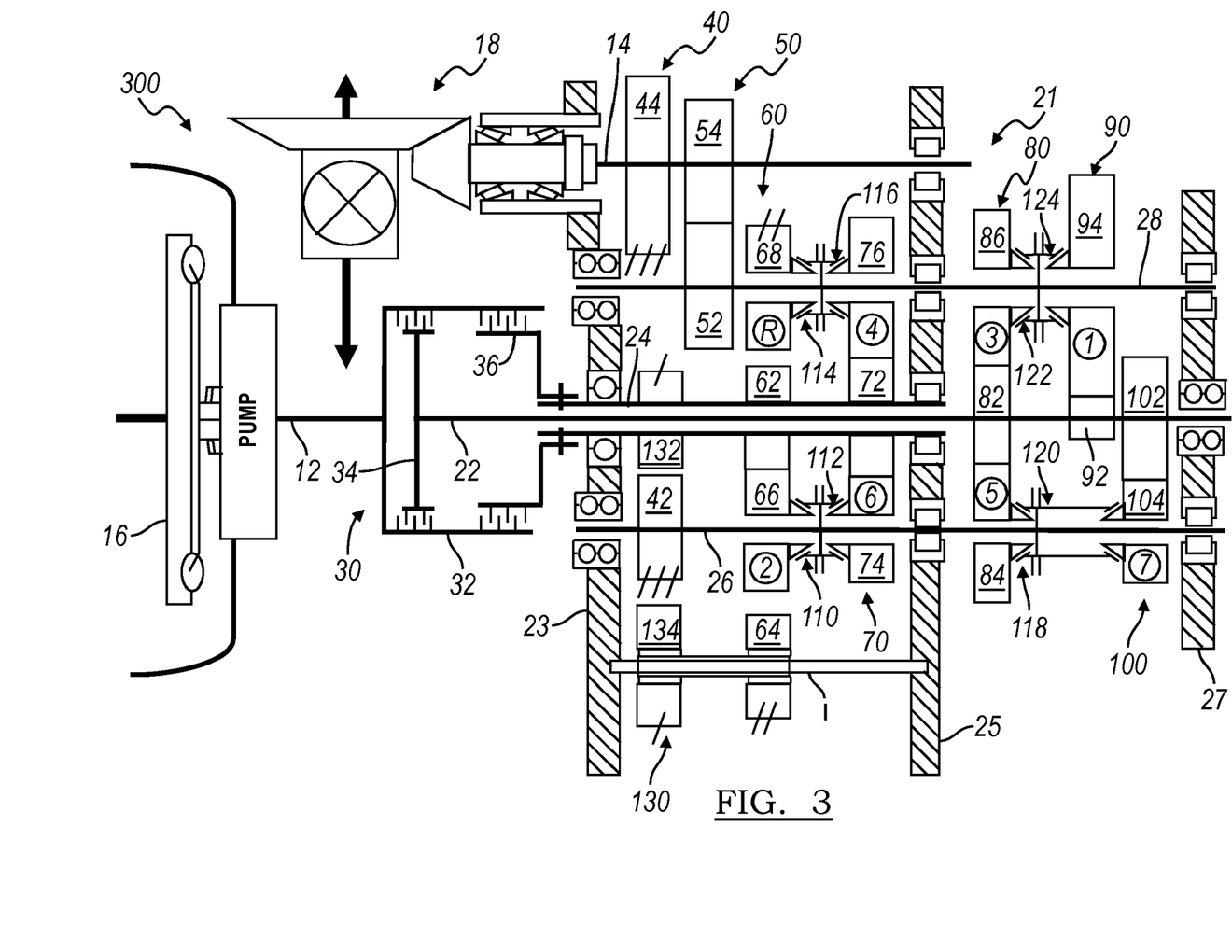
FIG. 3 is a schematic representation of a third embodiment of a transmission in accordance with the invention.

Referring to FIG. 3 a multi-speed transmission 300 is depicted. The transmission 300 includes an input member 12 and an output member 14. In this embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The transmission 300 includes a countershaft gearing arrangement 21 that includes intermediate shafts, countershafts, co-planar intermeshing gear sets and selectively engagable synchronizers as will be described herein. For instance, the countershaft gearing arrangement 21 includes a first intermediate shaft 22 and a second intermediate shaft 24, which is a sleeve shaft concentric with the first intermediate shaft 22. The countershaft gearing arrangement 21 further includes a first countershaft 26 and a second countershaft 28. The countershafts 26, 28 are both spaced from and parallel with the input shaft 12, the output shaft 14 and the intermediate shafts 22, 24.

The first and second intermediate shafts 22, 24, first and second countershafts 26, 28 and output shaft 14 are supported by a first, second and third support structure or wall 23, 25, 27 formed in the housing of transmission 10. As conventionally known, the walls 23, 25, 27 are fitted with bearings 29 for rotatably supporting the first and second intermediate shafts 22, 24, first and second countershafts 26, 28 and output shaft 14. Wall 23 is disposed closest to the torque converter 16 and the final drive unit 18. Wall 25 is disposed adjacent wall 23 and wall 27 is disposed adjacent wall 25.

A dual clutch 30 is connected between input shaft 12 and first and second intermediate shafts 22, 24. The dual clutch 30 includes a clutch housing 32 connected for common rotation with input shaft 12. Further, clutch 30 has first and second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates mounted thereon that interact to form a friction clutch. Further, clutch element 34 is connected for common rotation with first intermediate shaft 22 and clutch element 36 is connected for common rotation with second intermediate shaft 24. Thus, selective engagement of clutch element 34 with clutch housing 32, connects the input shaft 12 for common rotation with first intermediate shaft 22 and selective engagement of clutch element 36 with clutch housing 32, connects the input shaft 12 for common rotation with second intermediate shaft 24.

The countershaft gearing arrangement 21 also includes co-planar, intermeshing gear sets 40, 50, 60, 70, 80, 90 and 100 and a co-planar idler gear set 130. Gear set 40 is a transfer gear set that includes transfer gears 42 and 44. Transfer gear 42 is connected for common rotation with the countershaft 26 and intermeshes with transfer gear 44. Transfer gear 44 is connected for common rotation with output shaft 14. As shown in FIG. 3, transfer gear set 40 is disposed adjacent wall 23 and transfers torque from first countershaft 26 to output shaft 14.

Co-planar gear set 50 is a transfer gear set that includes gear 52 and gear 54. Transfer gear 52 is connected for common rotation with counter shaft 28 and intermeshes with transfer gear 54. Transfer gear 54 is connected for common rotation with output shaft 14. As shown in FIG. 3, transfer gear set 50 is disposed adjacent gear set 40 and transfers torque from second countershaft 28 to output shaft 14.

Gear set 60 includes co-planar intermeshing gears 62, 64, 66 and 68. Gear 62 is connected for common rotation with second intermediate shaft 24 and intermeshes with gear 66. Idler gear 64 is rotatable about idler axis I. Gear 64 also intermeshes with gear 68. Gear 66 is selectively connectable with first countershaft 26. Gear 68 is selectively connectable with second countershaft 28. As shown in FIG. 3, gear set 60 is disposed adjacent gear set 50 and provides second and reverse gear ratios.

Gear set 70 includes co-planar, intermeshing gears 72, 74 and 76. Gear 72 is connected for common rotation with second intermediate shaft 24. Gear 72 intermeshes with gear 74, which is selectively connectable for common rotation with countershaft 26. Gear 72 also intermeshes with gear 76, which is selectively connectable for common rotation with countershaft 28. As shown in FIG. 3, gear set 70 is disposed adjacent gear set 60 and wall 25 and provides fourth and sixth gear ratios.

Gear set 80 includes co-planar, intermeshing gears 82, 84 and 86. Gear 82 is connected for common rotation with first intermediate shaft 22. Gear 82 intermeshes with both gear 84 and gear 86. Gear 84 is selectively connectable for common rotation with the countershaft 26. Gear 86 is selectively connectable for common rotation with the countershaft 28. As shown in FIG. 3, gear set 80 is disposed adjacent wall 25 and provides fifth and third gear ratios.

Gear set 90 includes co-planar, intermeshing gears 92 and 94. Gear 92 is connected for common rotation with first intermediate shaft 22. Gear 92 intermeshes with gear 94. Gear 94 is selectively connectable for common rotation with countershaft 28. As shown in FIG. 3, gear set 90 is disposed between gear sets 80 and 100 and provides a first gear ratio.

Gear set 100 includes co-planar, intermeshing gears 102 and 104. Gear 102 is connected for common rotation with first intermediate shaft 22. Gear 102 intermeshes with gear 104. Gear 104 is selectively connectable for common rotation with the countershaft 26. As shown in FIG. 3, gear set 100 is disposed adjacent wall 27 and provides a seventh gear ratio.

Gear set 130 includes co-planar intermeshing gears 132 and 134. Gear 132 is connected for common rotation with second intermediate shaft 24 and intermeshes with idler gear 134. Idler gear 134 is rotatable about idler axis I and is rotationally fixed for common rotation with gear 64. As shown in FIG. 3, gear set 130 is disposed adjacent wall 23 and provides a reverse gear ratio.

The transmission 300 further includes a plurality of selectively engagable synchronizers 110, 112, 114, 116, 118, 120, 122 and 124. Synchronizers 110/112, 114/116, 118/120 and 122/124 are a left and right side of synchronizer assemblies, sharing a common synchronizer hub and sleeve. Synchronizer 110 is selectively engagable to connect gear 66 with countershaft 26 for common rotation therewith. Synchronizer 112 is selectively engagable to connect gear 74 with countershaft 26 for common rotation therewith. Synchronizer 114 is selectively engagable to connect gear 68 with countershaft 28 for common rotation therewith. Synchronizer 116 is selectively engagable to connect gear 76 with countershaft 28 for common rotation therewith. Synchronizer 118 is selectively engagable to connect gear 84 with countershaft 26 for common rotation therewith. Synchronizer 124 is selectively engagable to connect gear 94 with countershaft 28 for common rotation therewith. Synchronizer 122 is selectively engagable to connect gear 86 with countershaft 28 for common rotation therewith. Synchronizer 120 is selectively engagable to connect gear 104 with countershaft 26 for common rotation therewith.

The transmission 300 is capable of transmitting torque from the input shaft 12 to the output shaft 14 in at least seven forward torque ratios and one reverse torque ratio, as indicated in FIG. 3. Each of the forward torque ratios and the reverse torque ratio is attained by engagement of dual clutch 30 and one of the clutch elements 34, 36 and one or more of the synchronizers 110, 112, 114, 116, 118, 120, 122 and 124. Those skilled in the art will readily understand that a different speed ratio is associated with each torque ratio and how these torque ratios are achieved, based on the description of transmission 10. The gear arrangement and positioning of gear sets 90 and 100 allows for a different center distances between countershaft 26 and intermediate shafts 22 and 24 and between countershaft 28 and intermediate shafts 22 and 24.

Fourth Embodiment

Figure 4:
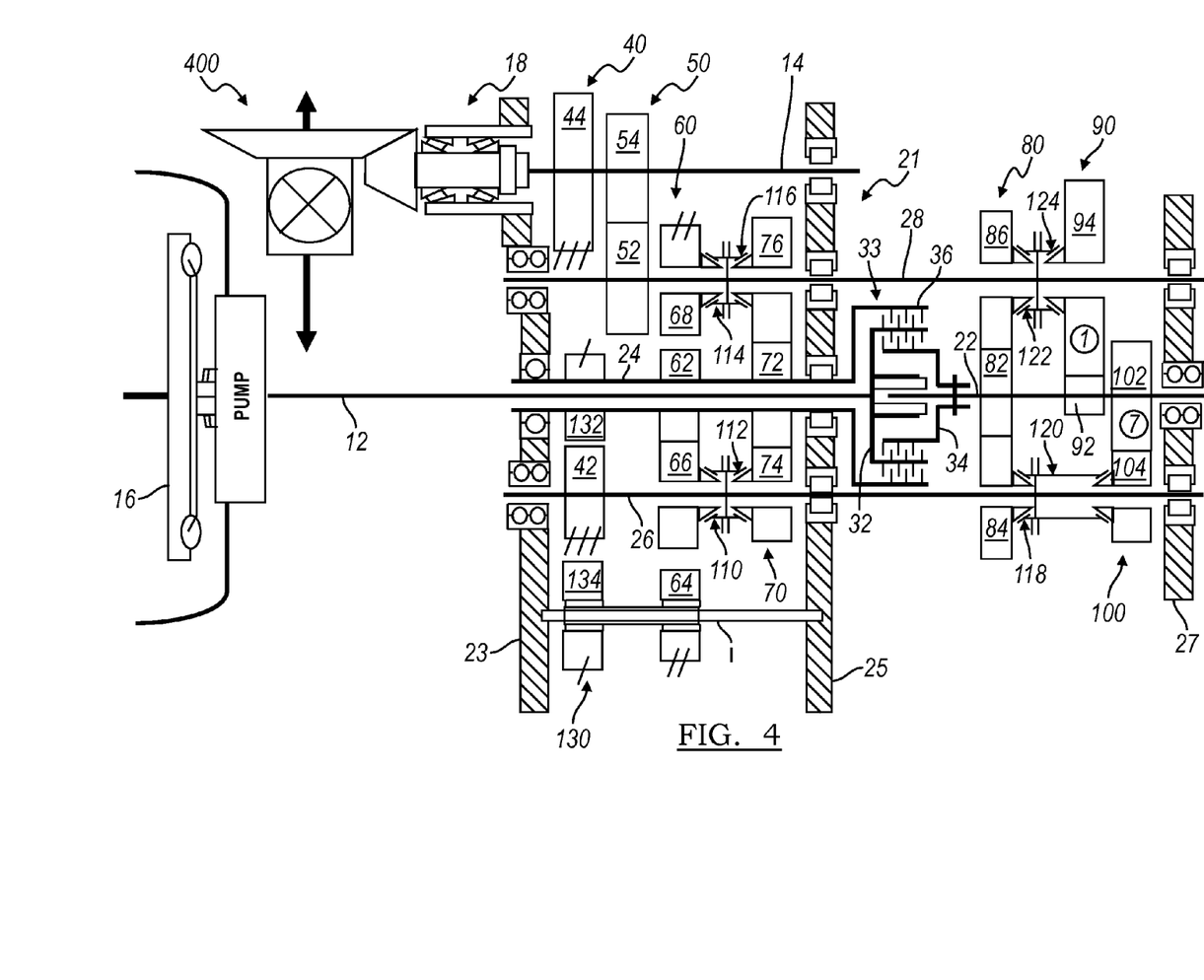
FIG. 4 is a schematic representation of a fourth embodiment of a transmission in accordance with the invention.

Referring to FIG. 4, a multi-speed transmission 400 is depicted. The transmission 400 includes an input member 12 and output member 14. The input shaft 12 is continuously connected with an engine (not shown). The output shaft 14 is continuously connected with the final drive unit 18. The transmission 400 includes the countershaft gearing arrangement 21 that includes intermediate shafts, a countershaft, co-planar intermeshing gear sets and selectively engagable synchronizers as described above with respect to the previous embodiment. For instance, the countershaft gearing arrangement 21 includes a first intermediate shaft 22 and a second intermediate shaft 24. However, in the present embodiment second intermediate shaft 24 is a sleeve shaft that is concentric with input shaft 12. Further, in the present embodiment a dual clutch 33 is positioned between co-planar gear sets. For example dual clutch 33 is positioned between gear set 70 and gear set 80. Dual clutch 33 includes a clutch housing 32 connected for common rotation with input shaft 12. Further, clutch 30 has first and second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates mounted thereon that interact to form a friction clutch. Further, clutch element 34 is connected for common rotation with first intermediate shaft 22 and clutch element 36 is connected for common rotation with second intermediate shaft 24. Thus, selective engagement of clutch element 34 with clutch housing 32, connects the input shaft 12 for common rotation with first intermediate shaft 22 and selective engagement of clutch element 36 with clutch housing 32, connects the input shaft 12 for common rotation with second intermediate shaft 24. Moreover, clutch element 36 is disposed radially outward of clutch housing 32 and clutch element 34 is disposed radially inward of clutch housing 32. The radial positioning of clutch elements 34 and 36 provides a significant transmission axial length reduction. Further the axial positioning of dual clutch 33 between wall 25 and gear set 80 provides a further reduction in the axial length of the transmission.

The first and second intermediate shafts 22, 24, first and second countershafts 26, 28 and output shaft 14 are supported by a first, second and third support structure or wall 23, 25, 27 formed in the housing of transmission 10. As conventionally known, the walls 23, 25, 27 are fitted with bearings 29 for rotatably supporting the first and second intermediate shafts 22, 24, first and second countershafts 26, 28 and output shaft 14. Wall 23 is disposed closest to the torque converter 16 and the final drive unit 18. Wall 25 is disposed adjacent wall 23 and wall 27 is disposed adjacent wall 25.

The transmission 400 is capable of transmitting torque from the input shaft 12 to the output shaft 14 in at least seven forward torque ratios and one reverse torque ratio, as indicated in FIG. 4. Each of the forward torque ratios and the reverse torque ratio is attained by engagement of dual clutch 33 and one of the clutch elements 34, 36 and one or more of the synchronizers 110, 112, 114, 116, 118, 120, 122 and 124. Those skilled in the art will readily understand that a different speed ratio is associated with each torque ratio and how these torque ratios are achieved, based on the description of transmission 10.

Fifth Embodiment

Figure 5:
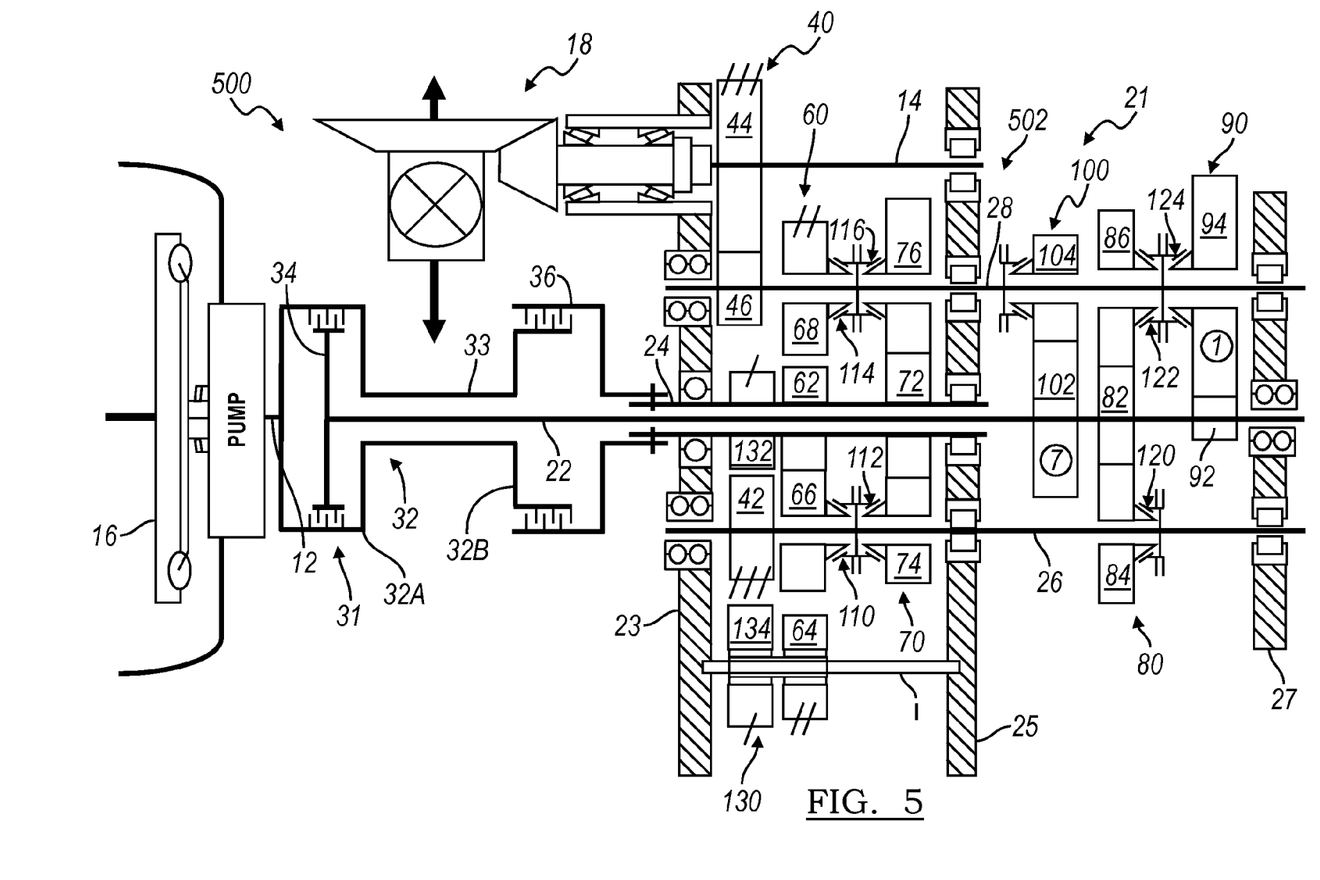
FIG. 5 is a schematic representation of a fifth embodiment of a transmission in accordance with the invention.

Referring to FIG. 5 a multi-speed transmission 500 is depicted. The transmission 500 includes an input member 12 and an output member 14. In this embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The transmission 500 includes a countershaft gearing arrangement 502 that includes intermediate shafts, countershafts, co-planar intermeshing gear sets and selectively engagable synchronizers as will be described herein. For instance, the countershaft gearing arrangement 23 includes a first intermediate shaft 22 and a second intermediate shaft 24, which is a sleeve shaft concentric with the first intermediate shaft 22. The countershaft gearing arrangement 23 further includes a first countershaft 26 and a second countershaft 28. The countershafts 26, 28 are both spaced from and parallel with the input shaft 12, the output shaft 14 and the intermediate shafts 22, 24.

A dual clutch 31 is connected between input shaft 12 and first and second intermediate shafts 22, 24. The dual clutch 31 includes a clutch housing 32 connected for common rotation with input shaft 12. Clutch housing 32 has a first clutch portion 32a and a second clutch portion 32b connected by a housing shaft 33. Housing shaft 33, for example, is a sleeve shaft that is concentric with first intermediate shaft 22 and may be welded or otherwise connected to first and second clutch portions 32a, 32b or integrally formed therewith. Housing shaft 33 allows first and second clutch portions 32a, 32b to be positioned remote from each other to provide packaging clearance for transverse extending shafts, drivelines and like elements coupled to final drive unit 18. Further, clutch 31 has a first and a second clutch elements or hubs 34 and 36. Clutch elements 34 and 36 together with housing 32 are configured to form a friction clutch, as well known in the art as a dual clutch. More specifically, clutch elements 34, 36 and clutch housing portions 32a, 32b have friction plates mounted thereon that interact to form a friction clutch. Further, clutch element 34 is connected for common rotation with first intermediate shaft 22 and clutch element 36 is connected for common rotation with second intermediate shaft 24. Thus, selective engagement of clutch element 34 with clutch housing portions 32a, 32b, connects the input shaft 12 for common rotation with first intermediate shaft 22 and selective engagement of clutch element 36 with clutch housing 32, connects the input shaft 12 for common rotation with second intermediate shaft 24.

The first and second intermediate shafts 22, 24, first and second countershafts 26, 28 and output shaft 14 are supported by a first, second and third support structure or wall 23, 25, 27 formed in the housing of transmission 10. As conventionally known, the walls 23, 25, 27 are fitted with bearings 29 for rotatably supporting the first and second intermediate shafts 22, 24, first and second countershafts 26, 28 and output shaft 14. Wall 23 is disposed closest to the torque converter 16 and the final drive unit 18. Wall 25 is disposed adjacent wall 23 and wall 27 is disposed adjacent wall 25.

The countershaft gearing arrangement 23 also includes co-planar, intermeshing gear sets 40, 60, 70, 80, 90 and 100 and a co-planar idler gear set 130. Gear set 40 is a transfer gear set that includes gears 42, 44 and 46. Transfer gear 42 is connected for common rotation with the countershaft 26 and intermeshes with gear 44. Transfer gear 44 is connected for common rotation with output shaft 14 and intermeshes with gear 46. Transfer gear 46 is connected for common rotation with the countershaft 28. As shown in FIG. 4, gear set 40 is disposed adjacent wall 23 and transfers torque from first countershaft 26 to output shaft 14.

Gear set 60 includes co-planar intermeshing gears 62, 64, 66 and 68. Gear 62 is connected for common rotation with second intermediate shaft 24 and intermeshes with gear 66. Idler gear 64 is rotatable about idler axis I. Idler gear 64 also intermeshes with gear 68. Gear 66 is selectively connectable with first countershaft 26. Gear 68 is selectively connectable with second countershaft 28. As shown in FIG. 5, gear set 60 is disposed adjacent gear set 40 and provides second and reverse gear ratios.

Gear set 70 includes co-planar, intermeshing gears 72, 74 and 76. Gear 72 is connected for common rotation with second intermediate shaft 24. Gear 72 intermeshes with gear 74, which is selectively connectable for common rotation with countershaft 26. Gear 72 also intermeshes with gear 76, which is selectively connectable for common rotation with countershaft 28. As shown in FIG. 5, gear set 70 is disposed adjacent gear set 60 and wall 25 and provides fourth and sixth gear ratios.

Gear set 80 includes co-planar, intermeshing gears 82, 84 and 86. Gear 82 is connected for common rotation with first intermediate shaft 22. Gear 82 intermeshes with both gear 84 and 86. Gear 84 is selectively connectable for common rotation with countershaft 26. Gear 86 is selectively connectable for common rotation with countershaft 28. As shown in FIG. 5, gear set 80 is disposed adjacent gear set 100 and provides a third and fifth gear ratios.

Gear set 90 includes co-planar, intermeshing gears 92 and 94. Gear 92 is connected for common rotation with first intermediate shaft 22. Gear 92 intermeshes with gear 94. Gear 94 is selectively connectable for common rotation with the countershaft 28. As shown in FIG. 5, gear set 90 is disposed adjacent gear set 90 and provides a first gear ratio.

Gear set 100 includes co-planar, intermeshing gears 102 and 104. Gear 102 is connected for common rotation with first intermediate shaft 22. Gear 102 intermeshes with gear 104. Gear 104 is selectively connectable for common rotation with the countershaft 28. As shown in FIG. 5, gear set 100 is disposed adjacent wall 25 and provides seventh gear ratio.

Gear set 130 includes co-planar intermeshing gears 132 and 134. Gear 132 is connected for common rotation with second intermediate shaft 24 and intermeshes with idler gear 134. Idler gear 134 is rotatable about idler axis I and is rotationally fixed for common rotation with gear 64. As shown in FIG. 5, gear set 130 is disposed adjacent wall 23 and provides a reverse gear ratio.

The transmission 500 further includes a plurality of selectively engagable synchronizers 110, 112, 114, 116, 118, 120, 122 and 124. Synchronizers 110/112, 114/116 and 122/124 are a left and right side of synchronizer assemblies, sharing a common synchronizer hub and sleeve. Synchronizer 110 is selectively engagable to connect gear 66 with countershaft 26 for common rotation therewith. Synchronizer 112 is selectively engagable to connect gear 74 with countershaft 26 for common rotation therewith. Synchronizer 114 is selectively engagable to connect gear 68 with countershaft 28 for common rotation therewith. Synchronizer 116 is selectively engagable to connect gear 76 with countershaft 28 for common rotation therewith. Synchronizer 118 is selectively engagable to connect gear 104 with countershaft 28 for common rotation therewith. Synchronizer 120 is selectively engagable to connect gear 84 with countershaft 26 for common rotation therewith. Synchronizer 122 is selectively engagable to connect gear 86 with countershaft 28 for common rotation therewith. Synchronizer 124 is selectively engagable to connect gear 94 with countershaft 28 for common rotation therewith.

The transmission 500 is capable of transmitting torque from the input shaft 12 to the output shaft 14 in at least seven forward torque ratios and one reverse torque ratio, as indicated in FIG. 5. Each of the forward torque ratios and the reverse torque ratio is attained by engagement of dual clutch 31 and one of the clutch elements 34, 36 and one or more of the synchronizers 110, 112, 114, 116, 118, 120, 122 and 124. Those skilled in the art will readily understand that a different speed ratio is associated with each torque ratio and how these torque ratios are achieved, based on the description of transmission 10. The gear arrangement and positioning of gear sets 90 and 100 allows for a different center distances between countershaft 26 and intermediate shafts 22 and 24 and between countershaft 28 and intermediate shafts 22 and 24. Moreover, the present embodiment provides the transfer gears (42, 44 and 46) in one plane to allow for a reduction in the axial length of the transmission.

Sixth Embodiment

Figure 6:
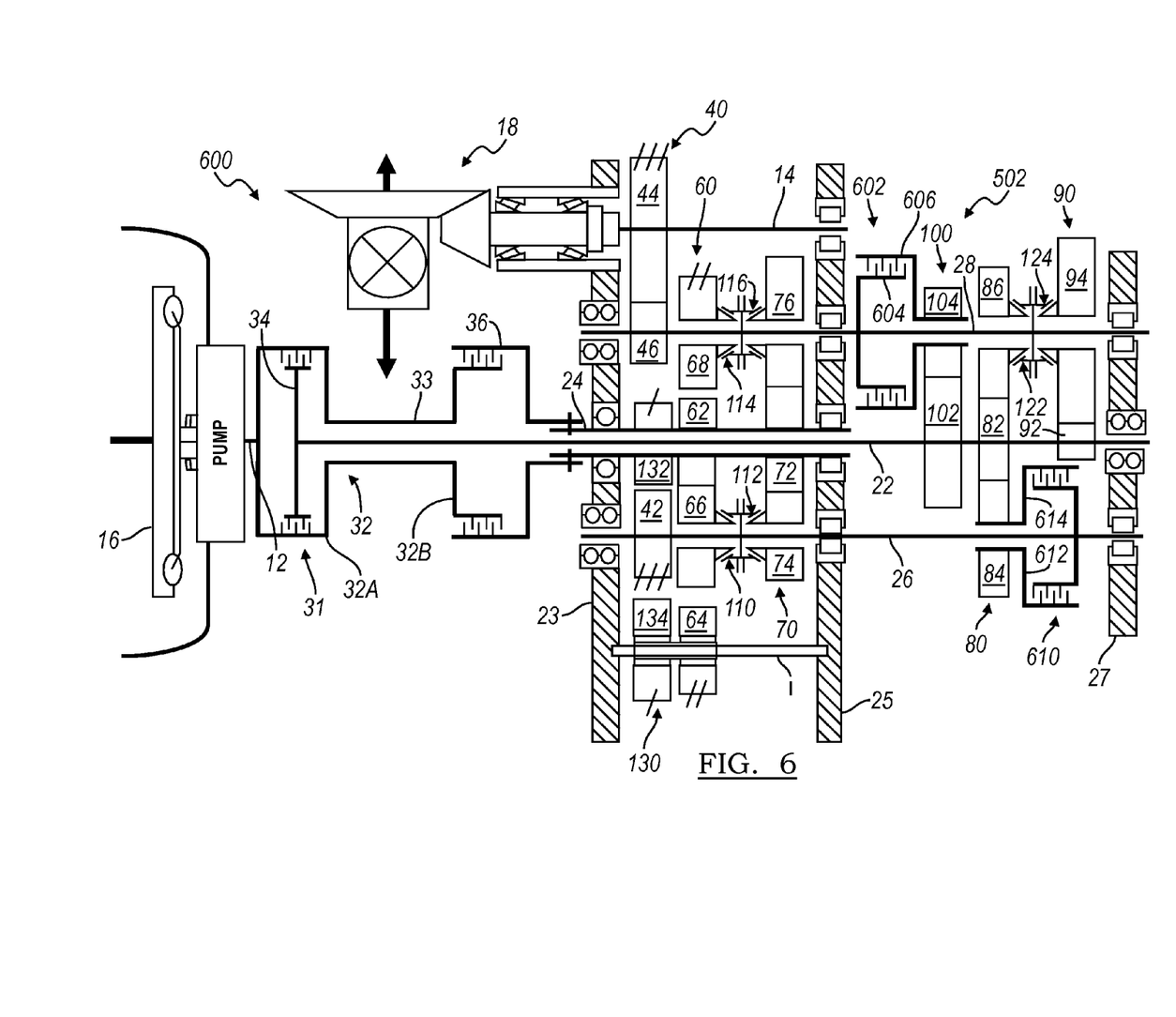
FIG. 6 is a schematic representation of a sixth embodiment of a transmission in accordance with the invention.

Referring to FIG. 6 a multi-speed transmission 600 is depicted. The transmission 600 includes an input member 12 and an output member 14. In this embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The transmission 600 includes countershaft gearing arrangement 502 and the dual clutch 31, as described in the previous embodiment and illustrated in FIG. 5.

However, in the present embodiment clutches 602 and 610 are provided for selectively engaging gears 104 and 84 for common rotation with countershafts 28 and 26, respectively. Further, clutches 602 and 610 have first and second clutch elements or hubs 604, 612 and 606, 614. Clutch elements 604 and 606 and clutch elements 612 and 614 are configured to form friction clutches, as well known in the art. More specifically, clutch elements 604, 612 and 606, 614 have friction plates mounted thereon that interact to form a friction clutch. Further, clutch element 604 is connected for common rotation with countershaft 28, clutch element 606 is connected for common rotation with gear 104, clutch element 612 is connected for common rotation with countershaft 26 and clutch element 614 is connected for common rotation with gear 84. Thus, selective engagement of clutch 602 connects the countershaft 28 with gear 104 and selective engagement of clutch 610 connects countershaft 26 for common rotation with gear 84.

Seventh Embodiment

Figure 7:
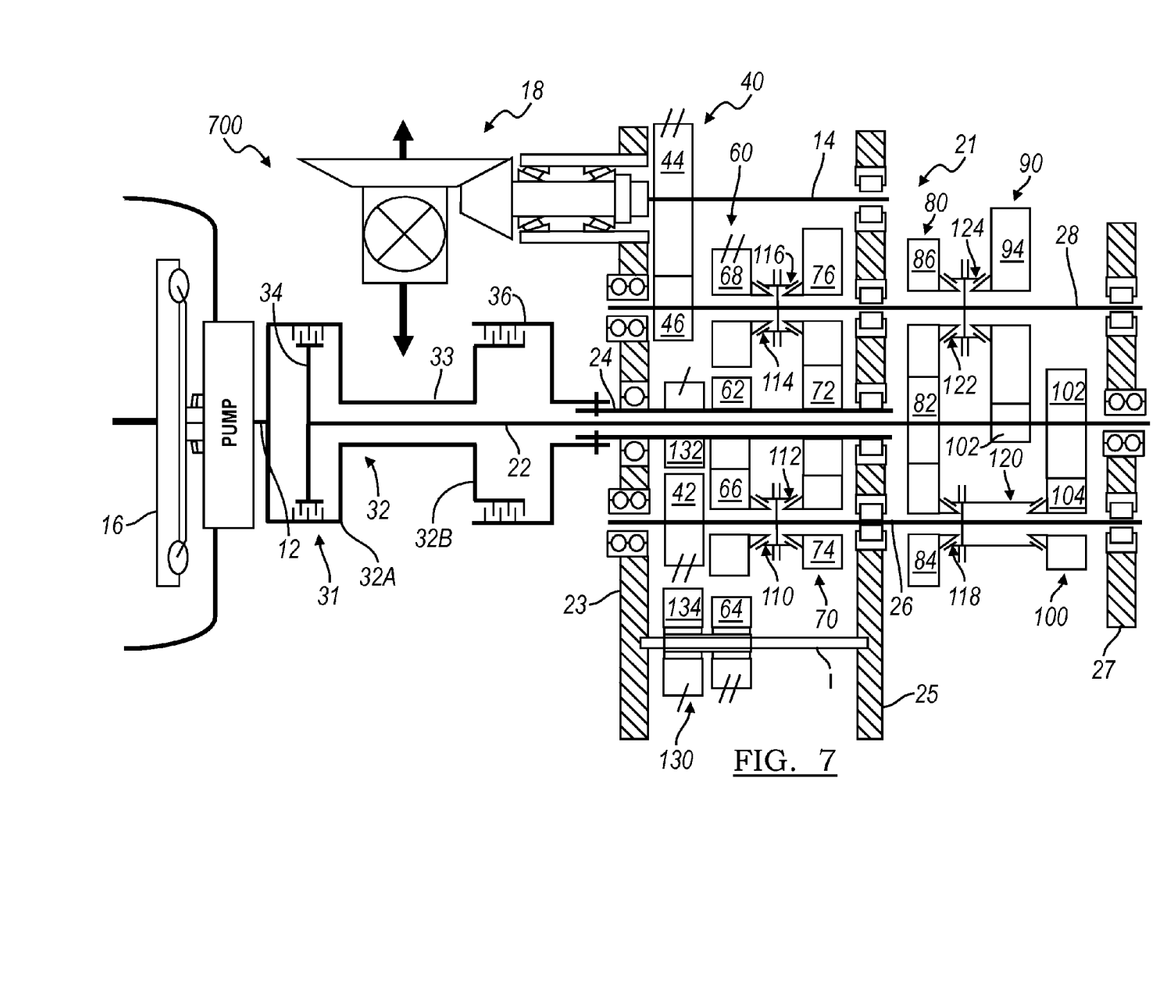
FIG. 7 is a schematic representation of a seventh embodiment of a transmission in accordance with the invention.

Referring to FIG. 7 a multi-speed transmission 700 is depicted. The transmission 700 includes an input member 12 and an output member 14. In this embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18.

The transmission 700 includes a countershaft gearing arrangement 21 that includes the same intermediate shafts, countershafts and selectively engagable synchronizers as described above with respect to the second embodiment shown in FIG. 2. Further, countershaft gearing arrangement 21 includes the same co-planar intermeshing gear sets as the second embodiment with the exception of gear set 50, which has been replaced by gear 46. More specifically, gear set 40 includes gears 42, 44 and 46. Gear 42 is connected for common rotation with the countershaft 26 and intermeshes with gear 44. Gear 44 is connected for common rotation with output shaft 14 and intermeshes with gear 46. Gear 46 is connected for common rotation with the countershaft 28. The connections of the other co-planar gear sets 60, 70, 80, 90, 100 to the intermediate shafts 22, 24, countershafts 26, 28 and synchronizers 110, 112, 114, 116, 118, 120, 122, 124 is the same as described above with respect to the second embodiment.

As in the previous embodiments, dual clutch 31 is connected between input shaft 12 and first and second intermediate shafts 22, 24. The dual clutch 31 includes a clutch housing 32 connected for common rotation with input shaft 12. Clutch housing 32 has a first clutch portion 32a and a second clutch portion 32b connected by a housing shaft 33. Housing shaft 33, for example, is a sleeve shaft that is concentric with first intermediate shaft 22 and may be welded or otherwise connected to first and second clutch portions 32a, 32b or integrally formed therewith. Housing shaft 33 allows first and second clutch portions 32a, 32b to be positioned remote from each other to provide packaging clearance for transverse extending shafts, drivelines and like elements coupled to final drive unit 18. Further, clutch 31 has a first and a second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates mounted thereon that interact to form a friction clutch. Further, clutch element 34 is connected for common rotation with first intermediate shaft 22 and clutch element 36 is connected for common rotation with second intermediate shaft 24. Thus, selective engagement of clutch element 34 with clutch housing 32, connects the input shaft 12 for common rotation with first intermediate shaft 22 and selective engagement of clutch element 36 with clutch housing 32, connects the input shaft 12 for common rotation with second intermediate shaft 24.

Eighth Embodiment

Figure 8:
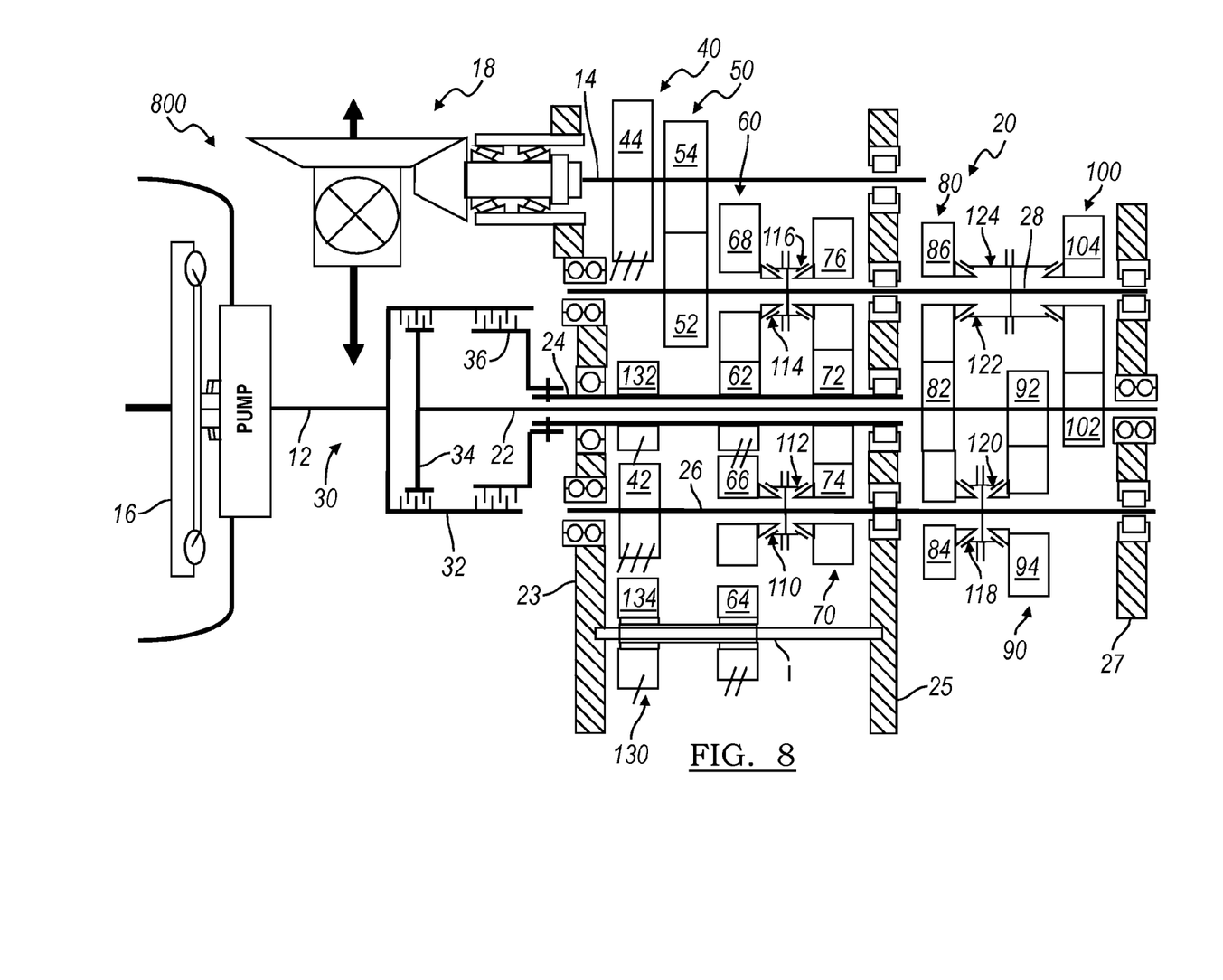
FIG. 8 is a schematic representation of an eighth embodiment of a transmission in accordance with the invention.

Referring to FIG. 8 a multi-speed transmission 800 is depicted. The transmission 800 includes an input member 12 and an output member 14. In this embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18.

The transmission 800 includes a countershaft gearing arrangement 20 that includes the same intermediate shafts, countershafts and selectively engagable synchronizers as described above with respect to the first embodiment shown in FIG. 1. Further, countershaft gearing arrangement 20 includes the same co-planar intermeshing gear sets as the first embodiment with the exception of gear set 130, which has been added. More specifically, gear set 130 includes co-planar intermeshing gears 132 and 134. Gear 132 is connected for common rotation with second intermediate shaft 24 and intermeshes with idler gear 134. Idler gear 134 is rotatable about idler axis I and is rotationally fixed for common rotation with gear 64. The connections of the other co-planar gear sets 50, 60, 70, 80, 90, 100 to the intermediate shafts 22, 24, countershafts 26, 28 and synchronizers 110, 112, 114, 116, 118, 120, 122, 124 is the same as described above with respect to the first embodiment. Further, the dual clutch 30 as described and illustrated with respect to the first embodiment is also provided in the present embodiment with the same connections to the input shaft 12 and the intermediate shafts 22, 24 as previously described.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
   a transmission input member;
   a power source for generating a torque in the input member;
   a first intermediate shaft;
   a second intermediate shaft concentric with the first intermediate shaft;
   a clutch selectively engagable to couple the transmission input member with one of the first and second intermediate shafts;
   a first and a second countershaft;
   a first set of gears connected for common rotation with the first intermediate shaft and intermeshing with a first selectable set of gears to form a first plurality of co-planar gear sets, wherein each of the gears of the first selectable set of gears is connectable for common rotation with one of the first and second countershafts for selectively transferring the torque to the countershafts when the clutch is engaged;
   a second set of gears connected for common rotation with the second intermediate shaft and intermeshing with a second selectable set of gears to form a second plurality of co-planar gear sets, wherein each of the gears of the second selectable set of gears is connectable for common rotation with one of the first and second countershafts for selectively transferring the torque to one of the countershafts when the clutch is engaged;
an output shaft disposed radially outward of the second intermediate shaft;
a first transfer gear coupled to one of the first and second countershafts for transferring torque from the first and second countershafts to the output shaft;
a first idler gear rotatable about a first idler axis and intermeshing with at least one of the first selectable sets of gears; and
a second idler gear rotatable about the idler axis and intermeshing with the at least one of the first set of gears.

2. The powertrain of claim 1, wherein the first set of gears further comprises two gears.

3. The powertrain of claim 1, wherein the second set of gears further comprises three gears.

4. The powertrain of claim 1, further comprising a second transfer gear connected for common rotation with one of the first and second countershafts and intermeshing with an output gear connected for common rotation with the output shaft for transferring torque from the countershaft to the output shaft.

5. The powertrain of claim 1, further comprising a plurality of synchronizers for selectively connecting the first and second set of selectable sets of gears to at least one of the countershafts.

6. The powertrain of claim 1, further comprising eight synchronizers for selectively connecting the first and second set of selectable sets of gears to at least one of the countershafts.

7. The powertrain of claim 1, further comprising a final drive unit wherein the final drive unit has an output shaft that is perpendicular to the input member.

8. The powertrain of claim 1, wherein the clutch is a dual clutch having a first hub connected to the first intermediate shaft and a second hub connected to the second intermediate shaft.

9. The powertrain of claim 8, wherein the first hub is remote from the second hub and wherein an output shaft of the final drive unit that is perpendicular to the input member is disposed between the first and second hub.

10. The powertrain of claim 1, wherein the clutch is disposed between the first and second plurality of co-planar gear sets.

11. The powertrain of claim 10, further comprising a third clutch for selectively connecting at least one of the first and second selectable set of gears to at least one of the countershafts.

12. The powertrain of claim 11, wherein the first, second and third clutches are friction clutches.

13. The powertrain of claim 1, further comprising a second clutch for selectively connecting at least one of the first and second selectable set of gears to at least one of the countershafts.

14. The powertrain of claim 1, wherein a first plurality of co-planar gear sets further comprises two co-planar gear sets.

15. The powertrain of claim 1, wherein a second plurality of co-planar gear sets further comprises three co-planar gear sets.

16. The powertrain of claim 1, wherein one of the second plurality of co-planar gear sets transfers the torque to achieve a first forward gear ratio.

17. The powertrain of claim 16, wherein the one of the second plurality of co-planar gear sets that transfers the torque to achieve the first forward gear ratio is disposed adjacent a structural wall of the housing of the powertrain.

18. The powertrain of claim 1, wherein one of the second plurality of co-planar gear sets transfers the torque to achieve a seventh forward gear ratio.

19. The powertrain of claim 18, wherein the one of the second plurality of co-planar gear sets that transfers the torque to achieve the seventh forward gear ratio is disposed adjacent a structural wall of the housing of the powertrain.

20. The powertrain of claim 1 wherein a first of the first plurality of co-planar gear sets include a first selectable gear and a first gear intermeshed with a second selectable gear, and wherein a second of the first plurality of co-planar gear sets include a first gear intermeshed with a first selectable gear and a second selectable gear, wherein the first gears are coupled to the first intermediate shaft, the first selectable gears are selectively connectable to the first countershaft, and the second selectable gears are selectively connectable to the second countershaft.

21. The powertrain of claim 20 wherein the first selectable gears of the first and second co-planar gear sets are selectively connectable to the first countershaft by a first synchronizer assembly having a pair of synchronizers and the second selectable gears of the first and second co-planar gear sets are selectively connectable to the second countershaft by a second synchronizer assembly having a pair of synchronizers.

22. The powertrain of claim 21 wherein the first co-planar gear set includes a second gear rotatable about an idler axis, wherein the first gear of the first co-planar gear set is intermeshed with the first selectable gear of the first co-planar gear set and with the second gear, and wherein the second gear is also intermeshed with the second selectable gear of the first co-planar gear set in order to provide a reverse gear ratio.

23. The powertrain of claim 21 wherein a third of the second plurality of co-planar gear sets include a first gear intermeshed with a first selectable gear and a second selectable gear, wherein the first gear is coupled to the second intermediate shaft, the first selectable gear is selectively connectable to the first countershaft, and the second selectable gear is selectively connectable to the second countershaft.

24. The powertrain of claim 23 wherein a fourth of the second plurality of co-planar gear sets and a fifth of the second plurality of co-planar gear sets each include a first gear intermeshed with a first selectable gear, wherein the first gears are coupled to the second intermediate shaft.

25. The powertrain of claim 24 wherein the first selectable gear of the fourth co-planar gear set is selectively connectable to the second countershaft and the first selectable gear of the fifth co-planar gear set is selectively connectable to the first countershaft.

26. The powertrain of claim 25 wherein the first selectable gears of the third and fifth co-planar gear sets are selectively connectable to the first countershaft by a third synchronizer assembly having a pair of synchronizers and the second selectable gear of the third co-planar gear set and the first selectable gear of the fourth co-planar gear set are selectively connectable to the second countershaft by a fourth synchronizer assembly having a pair of synchronizers.

27. The powertrain of claim 23 wherein the first selectable gear of the fourth co-planar gear set is selectively connectable to the first countershaft and the first selectable gear of the fifth co-planar gear set is selectively connectable to the second countershaft.

28. The powertrain of claim 27 wherein the first selectable gears of the third and fourth co-planar gear sets are selectively connectable to the first countershaft by a third synchronizer assembly having a pair of synchronizers and the second selectable gear of the third co-planar gear set and the first selectable gear of the fifth co-planar gear set are selectively connectable to the second countershaft by a fourth synchronizer assembly having a pair of synchronizers.

29. The powertrain of claim 23 wherein the first selectable gear of the fourth co-planar gear set is selectively connectable to the first countershaft and the first selectable gear of the fifth co-planar gear set is selectively connectable to the first countershaft.

30. The powertrain of claim 29 wherein the first selectable gears of the third and fourth co-planar gear sets are selectively connectable to the first countershaft by a third synchronizer assembly having a pair of synchronizers, the second selectable gear of the third co-planar gear set is selectively connectable to the second countershaft by a synchronizer, and the first selectable gear of the fifth co-planar gear set is selectively connectable to the first countershaft by a synchronizer.

31. The powertrain of claim 29 wherein the first selectable gears of the third and fourth co-planar gear sets are selectively connectable to the first countershaft by a third synchronizer assembly having a pair of synchronizers, the second selectable gear of the third co-planar gear set is selectively connectable to the second countershaft by a third clutch, and the first selectable gear of the fifth co-planar gear set is selectively connectable to the first countershaft by a fourth clutch.

32. A powertrain comprising:
a transmission input member;
a power source for generating a torque in the input member;
a first intermediate shaft;
a second intermediate shaft concentric with the first intermediate shaft;
a clutch selectively engagable to couple the transmission input member with one of the first and second intermediate shafts;
a first and a second countershaft;
a first set of gears connected for common rotation with the first intermediate shaft and intermeshing with a first selectable set of gears to form a first plurality of co-planar gear sets, wherein each of the gears of the first selectable set of gears is connectable for common rotation with one of the first and second countershafts for selectively transferring the torque to the countershaffs when the clutch is engaged;
a second set of gears connected for common rotation with the second intermediate shaft and intermeshing with a second selectable set of gears to form a second plurality of co-planar gear sets, wherein each of the gears of the second selectable set of gears is connectable for common rotation with one of the first and second countershafts for selectively transferring the torque to one of the countershafts when the clutch is engaged;
an output shaft disposed radially outward of the second intermediate shaft;
a first transfer gear coupled to one of the first and second countershafts for transferring torque from the first and second countershafts to the output shaft, and
wherein one of the first plurality of co-planar gear sets that produces a fourth and sixth gear ratio is adjacent a wall of the transmission.

33. The powertrain of claim 32 wherein the wall of the transmission is a middle wall disposed between a front wall of the transmission and a rear wall of the transmission.

* * * * *